United States Patent
Kaneda et al.

(10) Patent No.: US 6,292,331 B1
(45) Date of Patent: Sep. 18, 2001

(54) TAPE CASSETTE

(75) Inventors: Hiroshi Kaneda; Akio Momoi; Masatoshi Okamura, all of Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 09/438,371

(22) Filed: Nov. 12, 1999

(30) Foreign Application Priority Data

Nov. 19, 1998 (JP) ................................. 10-329524

(51) Int. Cl.⁷ .................................................. G11B 23/087

(52) U.S. Cl. ............................................................ 360/132

(58) Field of Search .......................... 360/132; 242/347.1

(56) References Cited

U.S. PATENT DOCUMENTS

| | | | |
|---|---|---|---|
| 4,893,766 | * | 1/1990 | Yamashina et al. ................. 242/198 |
| 5,654,855 | * | 8/1997 | Iwano et al. ........................ 360/132 |

FOREIGN PATENT DOCUMENTS 4-011271  3/1992  (JP).

* cited by examiner

Primary Examiner—Robert S. Tupper
(74) Attorney, Agent, or Firm—Oblon, Spivak, McClelland, Maier & Neustadt, P.C.

(57) ABSTRACT

The tape cassette comprises a case body for containing a pair of tape reels wound with a tape-shaped medium and an openable lid member provided in front of the cassette where the tape-shaped medium is exposed to an exterior. In an area adjacent to a joint portion P1 between a front plate 8 and a side plate 10 of a front lid constituting the lidmember, at least either one of the plates, for example, the side plate 10 is made thinner in thickness in a form of a slanted face 24, etc. Also in an area adjacent to a joint portion P2 between a top plate 14 and a side plate 15 of an upper lid 6, at least either one of the plates, for example, the top plate 14 is made thinner in thickness in a form of a concave 25. With this structure, the areas adjacent to the joint portions P1, P2 are hardened earlier than the other areas when the resin is set at the injection molding and the side plates 10 and 15 will not be inclined inwardly.

4 Claims, 4 Drawing Sheets

TAPE CASSETTE

BACKGROUND OF THE INVENTION

This invention relates to a tape cassette such as a digital video cassette which is used in a magnetic recording and reproducing apparatus, and more particularly to a tape cassette provided with an openable lid member in front of the cassette for protecting a tape medium.

In a conventional tape cassette of this type, a front lid having an L-shape in cross section is formed with a concave or a convex on its top plate, thereby to prevent a deflection of the front lid in a longitudinal direction caused by a shrinkage of a resin on occasion of injection molding (Post-examined Japanese Utility Model Publication 4-11271).

However, in case of the above described conventional tape cassette, even though the longitudinal deflection of the front lid can be prevented, side plates formed on opposite sides of the front lid and an upper lid constituting the lid member cannot be prevented from leaning due to the shrinkage of the resin.

Referring to FIGS. 4A and 4B, this leaning phenomenon will be explained.

FIG. 4A is a bottom view of the front lid in the conventional tape cassette, and FIG. 4B is an enlarged view of a joint portion between the side plates and the front plate of the front lid. As shown in FIG. 4A, the front lid 41 includes a front plate 42 covering the front face of the tape and a top plate 43 extending from an upper edge of the front plate 42 in an almost right angle. At opposite ends of the front plate 42 and the top plate 43 having a cross section of an L-shape, are integrally formed side plates 45 provided with sub shafts 44 which act as rotating axes of the front lid when it is opened or closed.

As shown in FIG. 4B in an enlarged scale, the front plate 42 and the side plate 45 are formed thicker in areas adjacent to the joint portion P1 therebetween than in other areas, because they constitute a corner zone, and thus, hardening after the injection molding proceeds more slowly at the joint portion than in surrounding areas. Accordingly, while the area adjacent to the joint portion P1 is hardened, the front plate 42 and the side plate 45 which have already been hardened are pulled in directions of arrows (a) and (b) by a shrinking force of the resin. For this reason, the side plate 45 inclines in a direction of an arrow (c) to come into a position as shown by a two-dot chain line, so that the front plate 42 and the side plate 45 may not intersect at a right angle.

In case where the side plate 45 inclines in this manner so that the front plate 42 and the side plate 45 may not intersect at a right angle, the front lid 41 cannot be smoothly opened or closed when it is fitted to the case body to be opened or closed, because the sub shaft 44 inclines or an inner face of the side plate abuts on an outer side face of the case body. Moreover, the shrinking force exerted as described above when the resin is set is likely to create sink marks around the joint portion P1 between the front plate 42 and the side plate 45, which will degrade strength as well as an outer appearance of the tape cassette.

Although not specifically illustrated, the above described problem may occur not only in the front lid, but also in the upper lid which is adapted to be opened or closed in association with the front lid.

SUMMARY OF THE INVENTION

The present invention has been made in order to overcome the above described problem, and it is an object of the invention to provide a tape cassette in which the inclination of the front lid and the upper lid due to the hardening shrinkage on occasion of the injection molding, and an occurrence of the sink marks will be avoided.

In order to achieve the above described objects, the tape cassette according to the present invention comprises a case body for containing a pair of tape reels wound with a tape-shaped medium and an openable lid member provided in front of the cassette where the tape-shaped medium is exposed to an exterior, the lid member including a main plate and side plates formed at opposite sides of the main plate, characterized in that at least either one of the main plate and the side plate is made thinner in thickness in an area adjacent to a joint portion between the main plate and the side plate. Further, the lid member has a front lid or a front lid and an upper lid. The front lid includes a front plate as the main plate and the side plates formed at opposite sides thereof, while the upper lid includes a top plate as the main plate and the side plates formed at opposite sides thereof. The thinner area adjacent to the joint portion is preferably realized in a form of a slanted face or a concave.

With the described structure, the area adjacent to the joint portion between the front plate and the side plate of the front lid which constitutes the lid member and the area adjacent to the joint portion between the top plate and the side plate of the upper lid are made thinner in thickness than the other areas. Therefore, when the resin is set on occasion of the injection molding, the areas adjacent to the joint portions will be hardened earlier than the other areas. As a result, the side plates will not be pulled inwardly to be inclined as in the conventional case. Moreover, the sink marks which are likely to occur in the areas adjacent to the joint portions will be avoided, and thus the degradation of the strength and the outer appearance will be eliminated.

BRIEF DESCRIPTION OF THE PREFERRED EMBODIMENTS

DETAILED DESCRIPTION OF THE PREFERRED EMBODIMENTS

Figure 1:
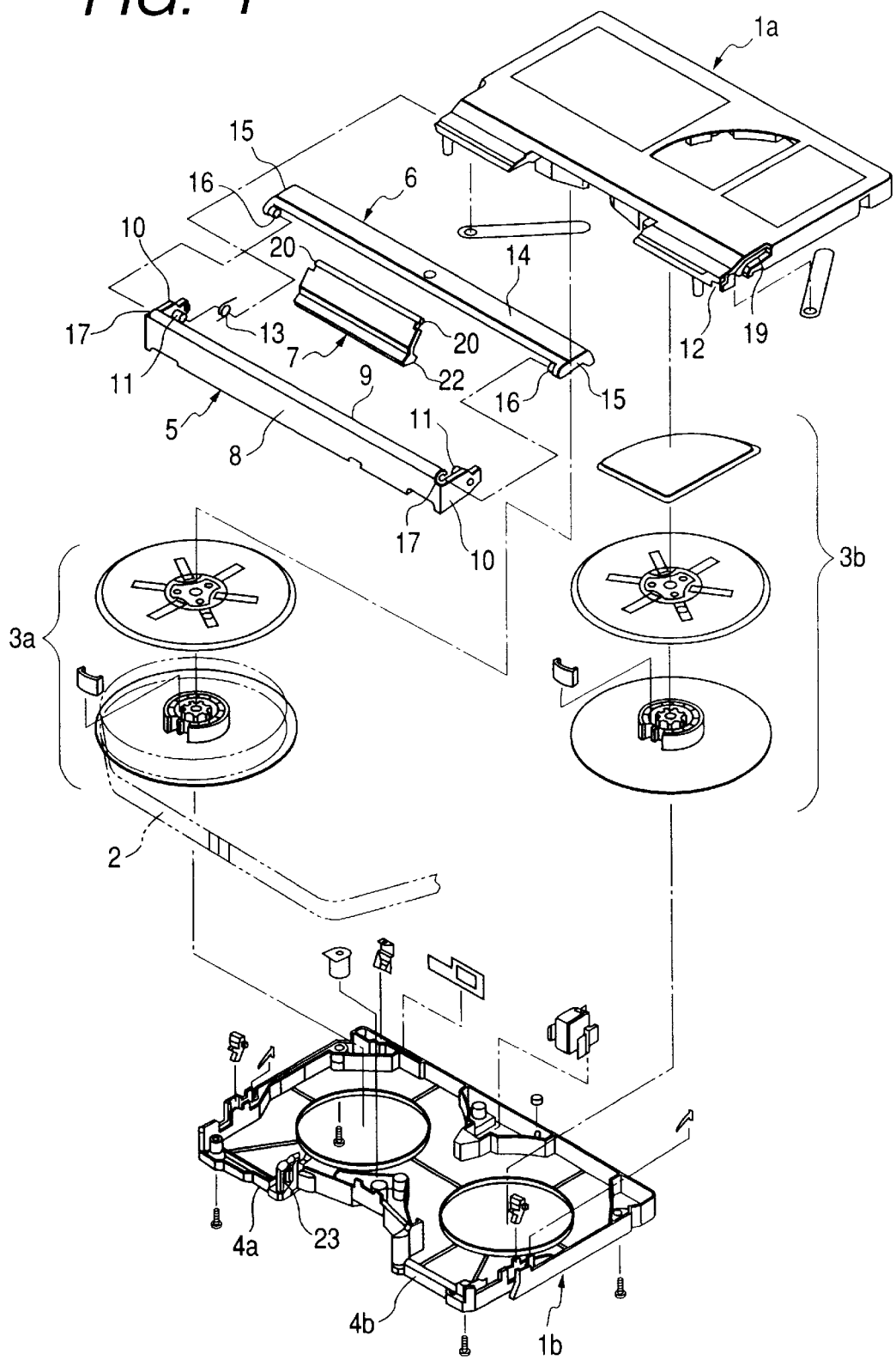
FIG. 1 is an exploded perspective view of a tape cassette according to an embodiment of the present invention, showing an entire structure.

Now, an embodiment of the present invention will be described referring to the drawings.

FIGS. 1 through 3 show one embodiment of the tape cassette according to the invention, in case where the tape cassette includes both the front lid and the upper lid as constituent elements of the lid member.

Figure 2A:
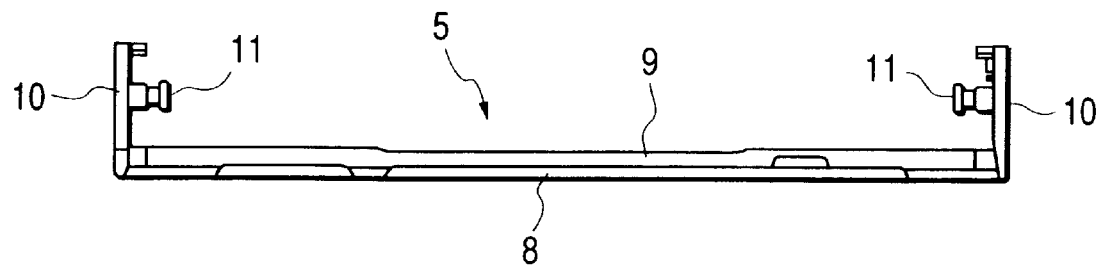
FIG. 2A is a bottom view of the front lid in FIG. 1.
Figure 2B:
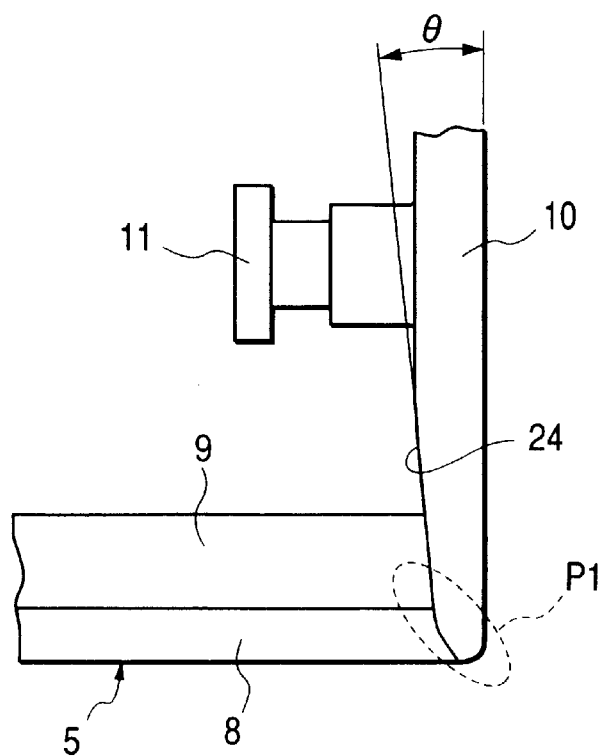
FIG. 2B is an enlarged view of a joint portion between a front plate and a side plate of the front lid.
Figure 3A:
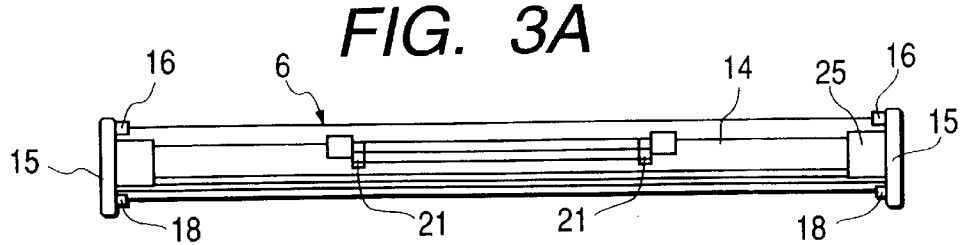
FIG. 3A is a rear view of the upper lid in FIG. 1.
Figure 3B:
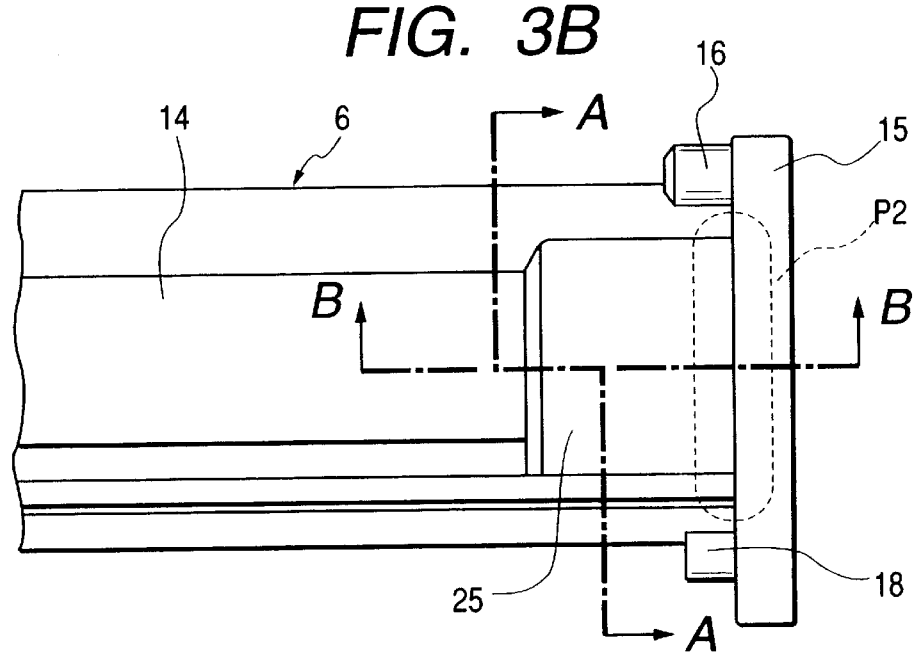
FIG. 3B is an enlarged view of a joint portion between a top plate and a side plate of the upper lid.
Figure 3C:
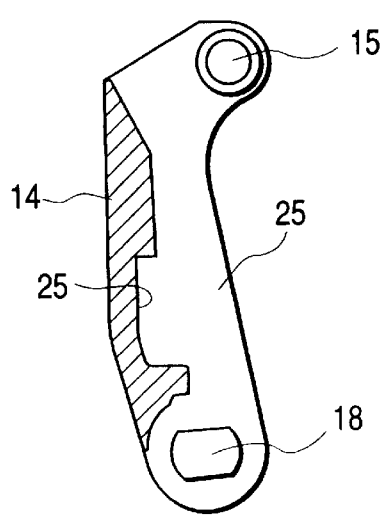
FIG. 3C is a sectional view taken along a line A—A in FIG. 3B.
Figure 3D:
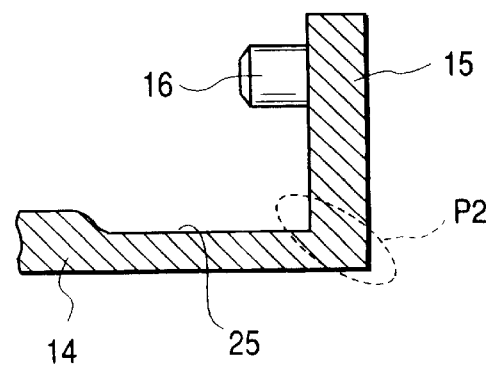
FIG. 3D is a sectional view taken along a line B—B in FIG. 3B.
Figure 4A:
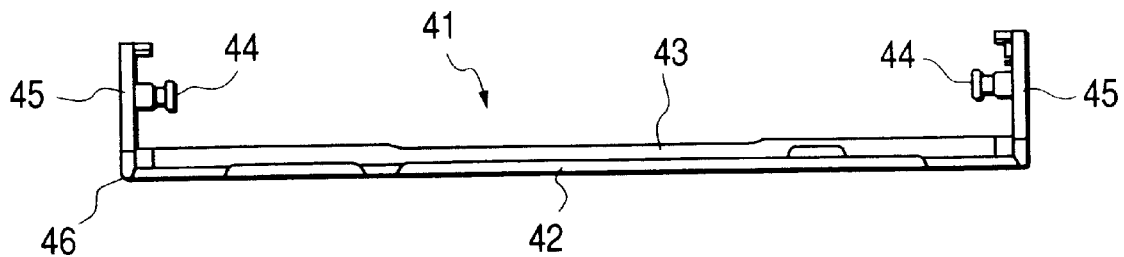
FIGS. 4A and 4B shows a structure of a conventional tape cassette.
Figure 4B:
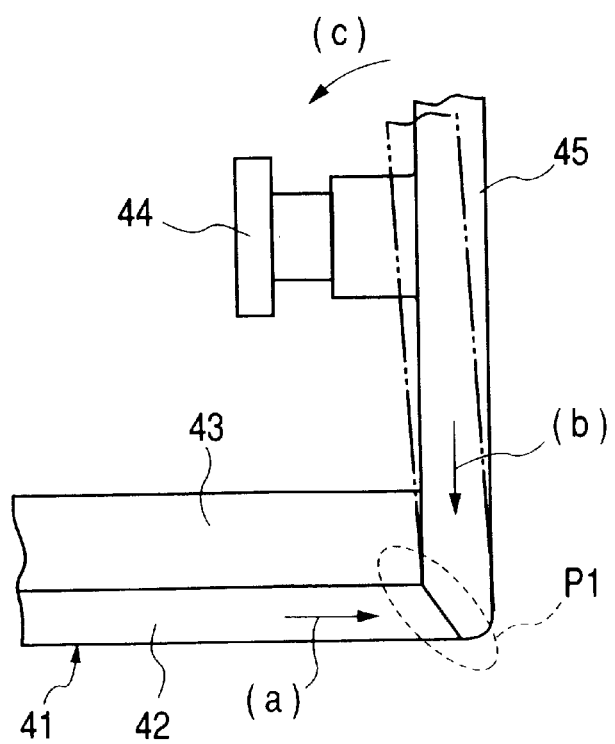

FIG. 1 is an exploded perspective view of the tape cassette according to the embodiment of the invention showing the entire construction thereof, FIG. 2A is a bottom view of the front lid, FIG. 2B is an enlarged view of the joint portion between the front plate and the side plate of the front lid, FIG. 3A is a rear view of the upper lid, FIG. 3B is an enlarged view of the joint portion between the top plate and the side plate of the upper lid, FIG. 3C is a sectional view taken along a line A—A in FIG. 3B, and FIG. 3D is a sectional view taken along a line B—B in FIG. 3B.

As shown in FIG. 1, the tape cassette according to the embodiment comprises an upper case 1a and a lower case 1b constituting a case body, in which a pair of tape reels 3a, 3b wound with a magnetic tape 2 is contained. At a front part of the lower case 1b are formed openings 4a, 4b. The magnetic tape 2 suspended between the tape reels 3a, 3b is so constructed as to be exposed to an exterior of the case through the openings 4a, 4b. The front part of the case body formed with the openings 4a, 4b is covered with a front lid 5, an upper lid 6 and a back lid 7 which can be freely opened and closed, so that the magnetic tape 2 cannot be touched when the cassette is not in use.

The front lid 5 consists of a front plate 8 which is the main plate, an upper plate 9 extending from upper edges of the front plate 8, and side plates 10 formed at the opposite ends of the front plate 8. Inner walls of the side plates 10 are provided with shafts 11. The front lid 5 is rotatably attached to the case body by rotatably engaging the shafts 11 in recesses 12 formed at both left and right sides of the upper case 1a. Between one (on the left hand in FIG. 1) of the shafts 11 and the recess 12 is provided a helical torsion coil spring 13 which always forces the front lid 5 to be kept closed by a spring force thereof.

The upper lid 6 consists of a top plate 14 which is the main plate, and side plates 15 formed at the opposite ends of the top plate 14. Inner walls of the side plates 15 are provided with first shafts 16 at their outward areas. By rotatably inserting the shafts 16 in engaging portions 17 formed at the opposite ends of the top plate 9 of the front lid 5, the upper lid 6 is rotatably fitted to the front lid 5. Further, the inner walls of the side plates 15 are formed with second shafts 18 at their inward areas as shown in FIGS. 3A and 3B. The second shafts 18 is attached to the upper case 1a so as to move along grooves 19 formed at side faces of the upper case 1a.

The back lid 7 is formed with such a dimension that it can be inserted into a gap between the openings 4a, 4b of the lower case 1b. Both the left and right side edges of the back lid 7 are provided with shafts 20 at the upper portions thereof. By rotatably engaging these shafts 20 with engaging portions 21 formed on the back face of the upper lid 6 (See FIG. 3A), the back lid 7 can be rotatably fitted to the upper lid 6. The left and right side edges of the back lid 7 are further provided with shafts 22 at the lower portions thereof. By engaging these shafts 22 with guide grooves 23 formed on outer walls of the openings 4a, 4b of the lower case 1b, a lower edge portion of the back lid 7 is so constructed as to move along the guide grooves 23.

When the above described tape cassette is loaded in the magnetic recording and reproducing apparatus and the front lid is rotated upwardly around the shafts 11, the upper lid 6 moves in association with the front lid 5 so that its shafts 18 move along the guide grooves 19 formed at the side faces of the upper case 1a. The back lid 7 also moves in association with the upper lid 6 so that the shafts 22 move along the guide grooves 23 formed on the outer walls of the openings 4a, 4b of the lower case 1b. In this way, the front lid 5, the upper lid 6 and the back lid 7 are opened, and it will become thus possible to record and reproduce the information with the magnetic tape 2 which is exposed through the openings 4a, 4b.

According to the invention, in the tape cassette having the above described structure, the joint portions between the front plate 8 and the side plates 10 of the front lid 5 as well as the joint portions between the top plate 14 and the side plates 15 of the upper lid 6 have such connecting structures as shown in FIGS. 2A), 2B, 3A, and 3B respectively, whereby the side plates 10 and 15 are prevented from leaning due to the shrinking force caused when the resin is set at the injection molding. ABS (acrylonitrile-butadiene-stylene) or PS (polystyrene) may be used as resin for the front lid 5 and the upper lid 6.

Now, the connecting structure between the front plate 8 and the side plate 10 of the front lid 5 in the illustrated embodiment will be described. According to the invention, the thickness of the side plate 10 is not kept the same in all the areas as in the conventional structure, but the side plate 10 is decreased in thickness at a determine angle θ toward the joint portion P1 between the front plate 8 and the side plate 10 to provide a slanted face 24. This slanted face 24 makes the area around the joint portion P1 thinner than the other areas.

In case of the above described connecting structure, the thickness of the area around the joint portion P1 is formed thinner than the other areas, and so, the area around the joint portion p1 will be hardened earlier than the other areas when the resin is set at the injection molding. Therefore, this will avoid such a phenomenon in the conventional case that the area around the joint portion P1 is hardened later, and the side plate 10 which has been already hardened is pulled inwardly and inclined by the shrinking force at that time.

From the fact that the connection between the front plate 8 and the side plates 10 is kept at a right angle, when the shafts 11 of the side plates 10 are fitted in the recesses 12 of the upper case 1a, the front lid 5 as a whole can be smoothly rotated around the shafts 11. The side plates 10 will not be inclined inwardly, and the area around the joint portion P1 will be free from the sink marks, hence the degradation in the strength and the outer appearance of the front lid 5 will be avoided.

In FIG. 2, the side plate 10 is formed with the slanted face 24 to reduce the thickness of the area adjacent to the joint portion P1. However, in place of the side plate 10, the front plate 8 or both the side plate 10 and the front plate 8 can be formed with the slanted face so as to reduce the thickness of the area adjacent to the joint portion P1. Further, instead of the slanted face 24, a concave or a step-like concave with a gradual depth may be employed to reduce the thickness of the plates.

Then, the connecting structure of the top plate 14 and the side plate 15 of the upper lid 6 will be described. According to the invention, a thickness of the top plate 14 is not the same as in the conventional structure, but the thickness of the top plate 14 adjacent to a joint portion P2 is so constructed as to form a concave 25 as shown in FIGS. 3A and 3B thereby to make the area adjacent to the joint portion P2 thinner than the other areas.

With such connecting structure, the thickness of the joint portion P2 is formed thinner than the other areas, and the area adjacent to the joint portion P2 will be hardened earlier when the resin is set at the injection molding. Accordingly, this eliminates the problem in the conventional case that the area adjacent to the joint portion P2 is hardened later, and the shrinking force on this occasion pulls and inclines the side plate inwardly which has been already hardened.

From the fact that the connection between the top plate 14 and the side plates 15 is kept at a right angle, the upper lid 6 can be smoothly rotated without any deflection, when the shafts 16, 18 are engaged with the engaging portions 17 of the front lid 5 and the guide grooves 19 in the upper case 1a. The sink marks will not occur in the area adjacent to the joint portion P2, and hence the strength and the outer appearance of the upper lid 6 will not be degraded.

In the embodiment illustrated in FIG. 3, the top plate 14 is formed with the concave 25 to make the thickness of the area adjacent to the joint portion P2 thinner. However, the side plate 15 may be formed with a concave instead of the top plate 14, or both the top plate 14 and the side plate 15 may be formed with concaves to make the thickness of the area adjacent to the joint portion P2 thinner. Besides the concave 25, there may be employed a slanted face or a step-like concave which will gradually become deeper to make the area thinner.

In the above described embodiment, there has been illustrated the tape cassette having both the front lid and the upper lid as the openable lid member for covering the front face of the cassette. However, this invention is not limited to the embodiment, but may be also applied to such a tape cassette as provided with only the front lid as the lid member.

As described above, according to the invention, the area adjacent to the joint portion between the front plate and the side plate of the front lid constituting the lid member and the joint portion between the top plate and the side plate of the upper lid also constituting the lid member are formed thinner than the other areas. Therefore, the areas adjacent to the joint portions will be hardened earlier when the resin is set at the injection molding. Accordingly, the areas adjacent to the joint portions will be hardened earlier, and the side plates will not be pulled inwardly and inclined. Further, the sink marks will not occur in the areas adjacent to the joint portions, and hence the strength and the appearance of the front lid and the upper lid will not be degraded.

What is claimed is:

1. A tape cassette comprising:
    a case body for containing a pair of tape reels wound with a tape medium; and
    an openable lid member provided in front of the cassette body where said tape medium is exposed to an exterior, said openable lid member including a main plate and side plates formed at opposite sides of said main plate,
    wherein at least either one of said main plate and said side plate is made thinner in thickness in an area adjacent to a joint portion between said main plate and said side plate.

2. A tape cassette as claimed in claim 1 wherein said lid member includes:
    a front lid including a front plate as the main plate and the side plates formed at opposite sides thereof; and
    a upper lid including a top plate as the main plate and the side plates formed at opposite sides thereof.

3. A tape cassette as claimed in claim 1, wherein said thinner area adjacent to said joint portion is in a form of a slanted face or a concave.

4. A tape cassette as claimed in claim 2, wherein said thinner area adjacent to said joint portion is in a form of a slanted face or a concave.

* * * * *